United States Patent
Zettwoch

(10) Patent No.: US 7,573,902 B2
(45) Date of Patent: *Aug. 11, 2009

(54) FIBRE CHANNEL INTERFACE UNIT

(75) Inventor: Robert Neal Zettwoch, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 709 days.

This patent is subject to a terminal disclaimer.

(21) Appl. No.: 10/650,597

(22) Filed: Aug. 28, 2003

(65) Prior Publication Data

US 2005/0047324 A1 Mar. 3, 2005

(51) Int. Cl.
*H04J 3/16* (2006.01)
(52) U.S. Cl. .................. 370/466; 370/389; 370/474
(58) Field of Classification Search .................. 370/205, 370/464–466, 516, 389, 392, 474, 476, 535, 370/537, 538, 540, 541; 375/241–254
See application file for complete search history.

(56) References Cited

U.S. PATENT DOCUMENTS

| | | | |
|---|---|---|---|
| 4,556,284 A | 12/1985 | Albersdoerfer et al. | |
| 4,933,929 A | 6/1990 | Tajima | |
| 5,394,265 A | 2/1995 | Nagel et al. | |
| 5,481,399 A | 1/1996 | Nagel et al. | |
| 5,953,139 A | 9/1999 | Nemecek et al. | |
| 5,963,567 A | 10/1999 | Veselka et al. | |
| 6,005,702 A | 12/1999 | Suzuki et al. | |
| 6,023,362 A | 2/2000 | Walker et al. | |
| 6,111,675 A | 8/2000 | Mao et al. | |
| 6,215,789 B1* | 4/2001 | Keenan et al. | 370/399 |
| 6,252,693 B1 | 6/2001 | Blauvelt | |
| 6,307,859 B1* | 10/2001 | Tedenstig | 370/401 |
| 6,310,709 B1 | 10/2001 | Bergano | |
| 6,343,217 B1* | 1/2002 | Borland | 375/243 |
| 6,441,950 B1 | 8/2002 | Chen et al. | |
| 6,507,672 B1* | 1/2003 | Watkins et al. | 375/240.01 |
| 6,549,311 B1 | 4/2003 | Hakki et al. | |
| 6,561,454 B1* | 5/2003 | White, III | 244/1 R |
| 2001/0015968 A1 | 8/2001 | Sicher et al. | |
| 2003/0013465 A1* | 1/2003 | Choong et al. | 455/466 |
| 2004/0010729 A1* | 1/2004 | Lockridge et al. | 713/500 |

* cited by examiner

*Primary Examiner*—Ricky Ngo
*Assistant Examiner*—Pao Sinkantarakorn

(57) ABSTRACT

Fibre Channel interface apparatus and methods are disclosed. In one embodiment, a system is provided for interfacing with at least one node in a Fibre Channel network. The system includes at least one input interface that is couplable to receive a plurality of frames of data that are transmitted from or received at a node of the Fibre Channel network. An output telemetry interface is couplable to provide the received frames of data to a telemetry and/or recording device.

11 Claims, 7 Drawing Sheets

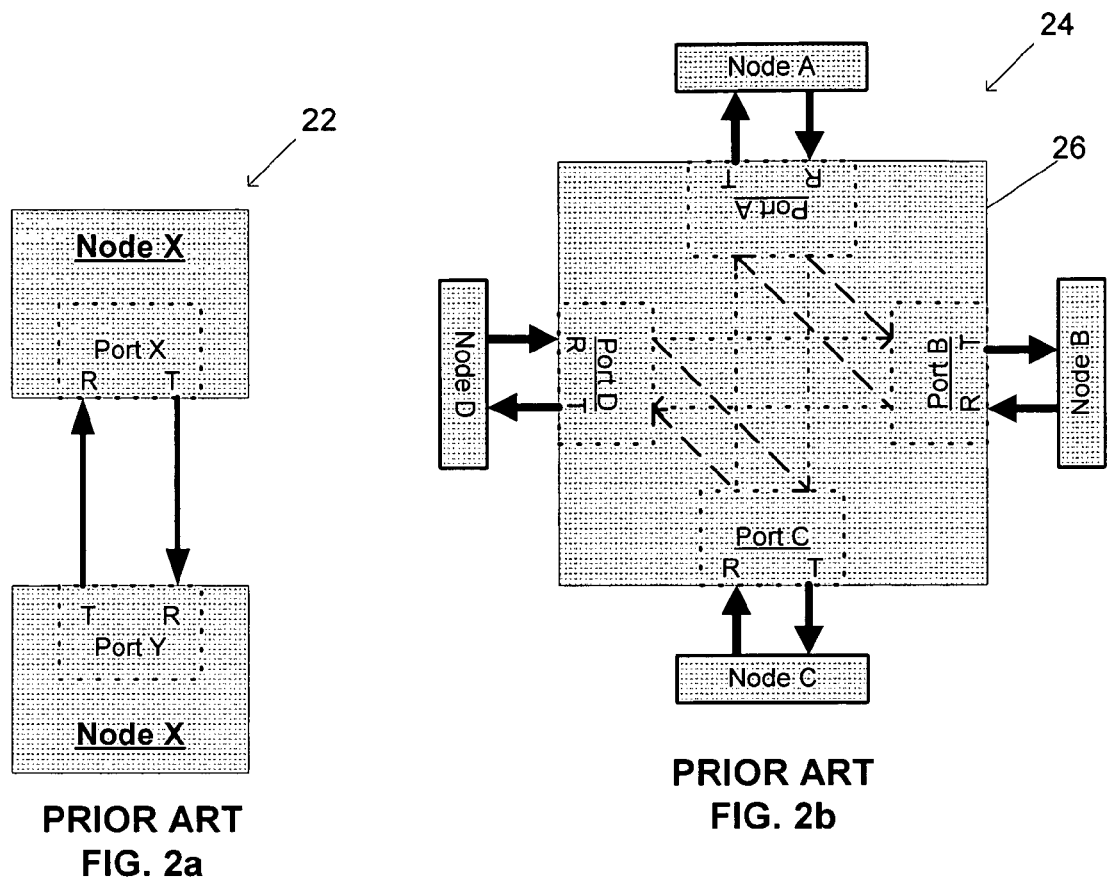
PRIOR ART
FIG. 2a
PRIOR ART
FIG. 2b
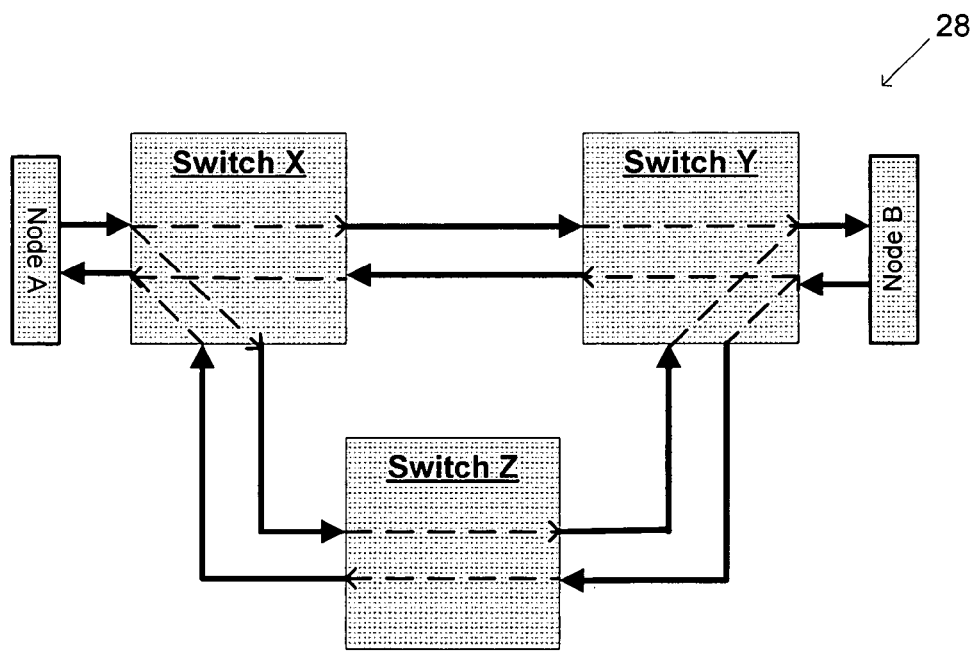
PRIOR ART
FIG. 3

FIBRE CHANNEL INTERFACE UNIT

GOVERNMENT LICENSE RIGHTS

This invention was made with Government support under U.S. Government contract N00019-01-C-0074 awarded by the U.S. Navy. The Government has certain rights in this invention.

FIELD OF THE INVENTION

The present invention relates generally to network interfaces and, specifically, to Fibre Channel network interfaces.

BACKGROUND OF THE INVENTION

In many applications, electronic equipment is interconnected and communicates with each other via a network. An example of electronic equipment interconnected in a network includes avionics, such as a radar system, on an aircraft. In order for the electronic equipment to communicate with each other, communication standards or protocol are used. One such communication standard is MIL-STD-1553.

Referring to FIG. 1, a network 10 known in the prior art uses MIL-STD-1553 communications. Remote terminals, A, B, C, X, Y, and Z are coupled to a primary bus 12 and a secondary bus 14. The primary and secondary buses 12 and 14 are controlled by a bus controller 16. Because it is often desirable to monitor data that is communicated within the network 10 in order to evaluate operation of the system, a monitor 18 is coupled to the primary and secondary buses 12 and 14 and a recorder and/or telemetry device 20 is coupled to the monitor 18.

Each of the remote terminals A, B, C, X, Y, and Z can transmit or receive at a baud rate of approximately 1 million bits per second (Mbps). Each data word is a 16-bit word, and each frame can hold up to 32 data words. Each frame starts with an address and contains a data block, and typically stands on its own. However, as noted above, the transmit and receive protocol is half duplex, such that each remote terminal transmits or receives at the baud rate.

To accommodate performance enhancements and their associated increases in data requirements, advanced systems may include a Fibre Channel network instead of a MIL-STD-1553 network. Each node on a Fibre Channel network can simultaneously transmit and receive at a baud rate of 1 gigabps (that is, a full duplex transmit-receive protocol). Each data word includes 32 bits, and each frame can include up to 528 data words. Each frame is only part of a sequence of frames, and these sequences can be part of different exchanges. Therefore, one frame is out of context without the other frames from the same sequence of an exchange.

Referring to FIG. 2A, a Fibre Channel network 22 known in the prior art is a simple connection of two Fibre Channel nodes X and Y. All of the Fibre Channel connections are single point-to-point. That is, a transmitter port T of node X is directly connected to a receiver port R of the node Y. Conversely, a transmitter port T of the node Y is directly connected to a receiver port R of the node X.

Referring now to FIG. 2B, a Fibre Channel network 24 known in the prior art includes a four port Fibre Channel switch 26. The switch 26 enables communication paths to occur simultaneously between two nodes. For example, the node A can communicate with the node C and the node B can communicate with the node D as illustrated by the dotted lines. Alternately, the node A can communicate with the node B and the node C can communicate with the node D as illustrated by the dashed lines.

With multiple switches, multiple paths can be found and, therefore, variable frame delays may result. Referring now to FIG. 3, a Fibre Channel network 28 known in the prior art includes multiple switches X, Y, and Z and nodes A and B. When using multiple switches, one path may become busy for an instant in time. This may cause a next frame in a sequence to be routed using another path, which can create different delays for each frame of a sequence. For example, the following sequence may be sent by the node A: FRAME#1, FRAME#2, FRAME#3, FRAME#4, FRAME#5, and FRAME#6. However, the sequence received by the node B may be as follows: FRAME#1, FRAME#3, FRAME#2, FRAME#5, FRAME#4, and FRAME#6. A lower level device driver of the receiving node is responsible for reordering the frames back to the original order.

As with communications in a MIL-STD-1553 networked system, it would be desirable to monitor and record data communicated within a Fibre Channel network. However, with a network switch, a Fibre Channel network can have multiple devices conversing with each other at the same time. This is because each of the ports on the switch is isolated from the other ports. Moreover, some applications may entail use of multiple switches to provide dual redundancy. Further, some applications, such as without limitation fighter aircraft, require dual redundancy. Redundancy implies that there are at least two paths between every node and that the exact same conversation will not occur simultaneously. Therefore, use of multiple switches to provide redundancy complicates even further the task of monitoring of communications within a Fibre Channel network including multiple switches.

Monitoring communications between multiple switches in a Fibre Channel network may entail intrusive modifications to hardware, such as providing special ports on switches. Also, communications that may be monitored may be limited to those that comply with certain upper level communication protocols. As a result, such monitoring may be time and labor intensive, expensive, and limited in applicability.

Thus, there is an unmet need in the art for an interface unit for monitoring communications in a Fibre Channel network that is non-intrusive, independent of upper level communication protocols, inexpensive, and easy to install.

SUMMARY OF THE INVENTION

The present invention provides a Fibre Channel interface apparatus and methods that are able to monitor multiple nodes of a Fibre Channel network, extract node specific information, and communicate the information to conventional recorders. Advantageously, the present invention does not entail use of prior knowledge of upper level protocol layers and is independent of protocols. As a result, complex protocol programming is avoided. As a further result, the present invention may be quickly and easily installed into any Fibre Channel networked system.

According to one exemplary non-limiting embodiment of the present invention, a device is provided for interfacing with at least one node in a Fibre Channel network. The device includes at least one input interface that is couplable to receive a plurality of frames of data that are transmitted from or received at a node of the Fibre Channel network. An output interface is couplable to provide the received frames of data to a telemetry and/or recording device.

According to an aspect of the present invention, the input interface may be terminated with an optical connection or with an electrical connection, as desired.

According to another aspect, the input interface may be programmable to receive all of the plurality of the frames of data that are transmitted from or received at the node. Alternately, the input interface may be programmable to receive frames of data received at the node from source nodes having predetermined addresses or frames of data transmitted from the node to destination nodes having predetermined addresses.

According to a further aspect, the output interface may be configured to provide the received frames of data in pulse code modulation formatted frames. If desired, the output interface may be configured to fill the pulse code modulation frames with a fill word when a frame of data is not available from the input interface.

BRIEF DESCRIPTION OF THE DRAWINGS

The preferred and alternative embodiments of the present invention are described in detail below with reference to the following drawings.

FIG. 2A is a block diagram of a simple prior art Fibre Channel network;

FIG. 2B is a block diagram of a prior art Fibre Channel network including a Fibre Channel switch;

FIG. 3 is a prior art Fibre Channel network using multiple Fibre Channel switches;

DETAILED DESCRIPTION OF THE INVENTION

The present invention relates to Fibre Channel interface apparatus and methods. Many specific details of certain embodiments of the invention are set forth in the following description and in FIGS. 4-8 to provide a thorough understanding of such embodiments. One skilled in the art, however, will understand that the present invention may have additional embodiments, or that the present invention may be practiced without several of the details described in the following description.

By way of overview, in one embodiment in accordance with the present invention, a device is provided for interfacing with at least one node in a Fibre Channel network. The device includes at least one input interface that is couplable to receive a plurality of frames of data that are transmitted from or received at a node of the Fibre Channel network. An output telemetry interface is couplable to provide the received frames of data to a telemetry device.

Figure 1:
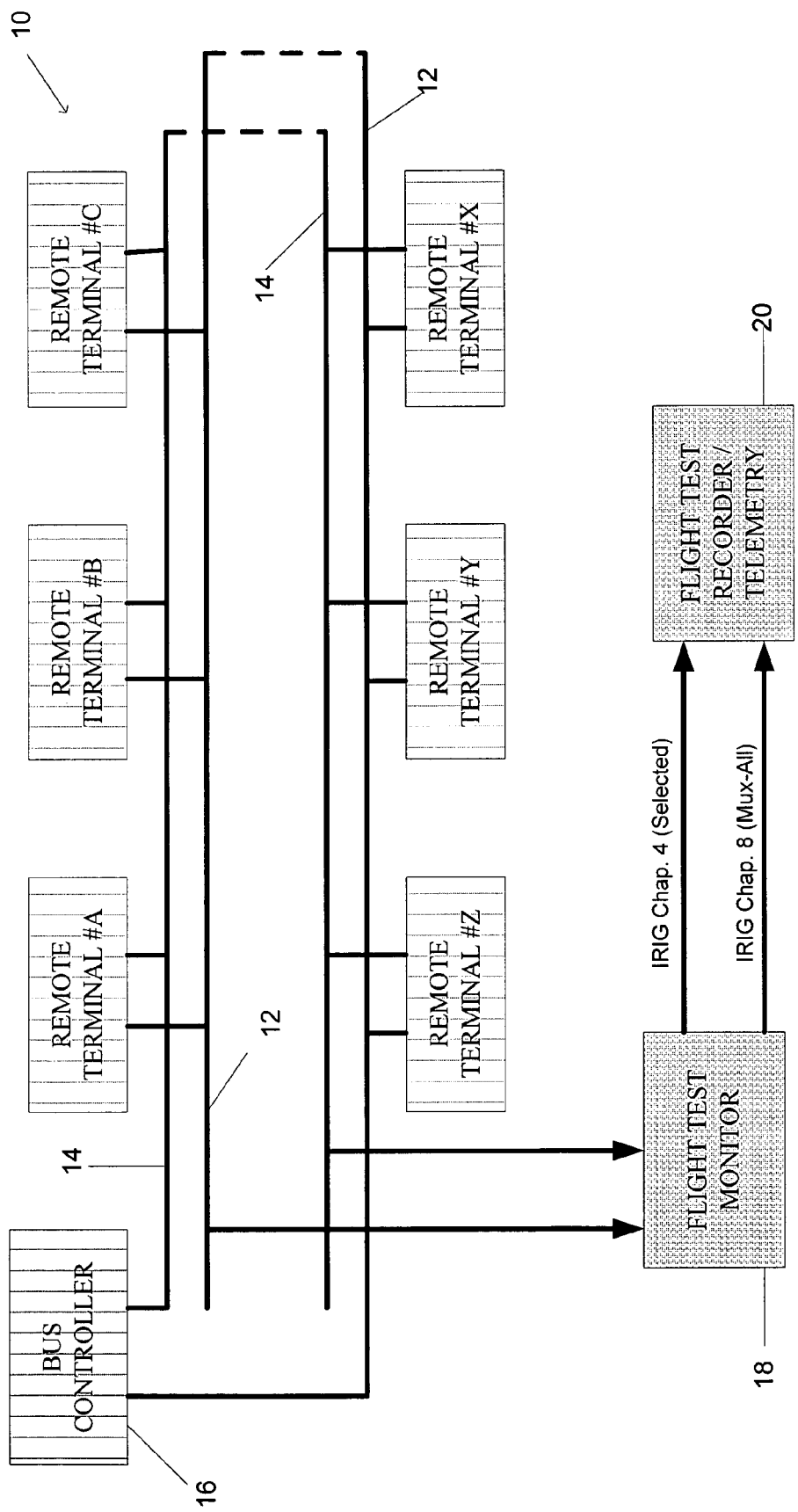
FIG. 1 is a block diagram of a prior art network using MIL-STD-1553 communications.
Figure 4:
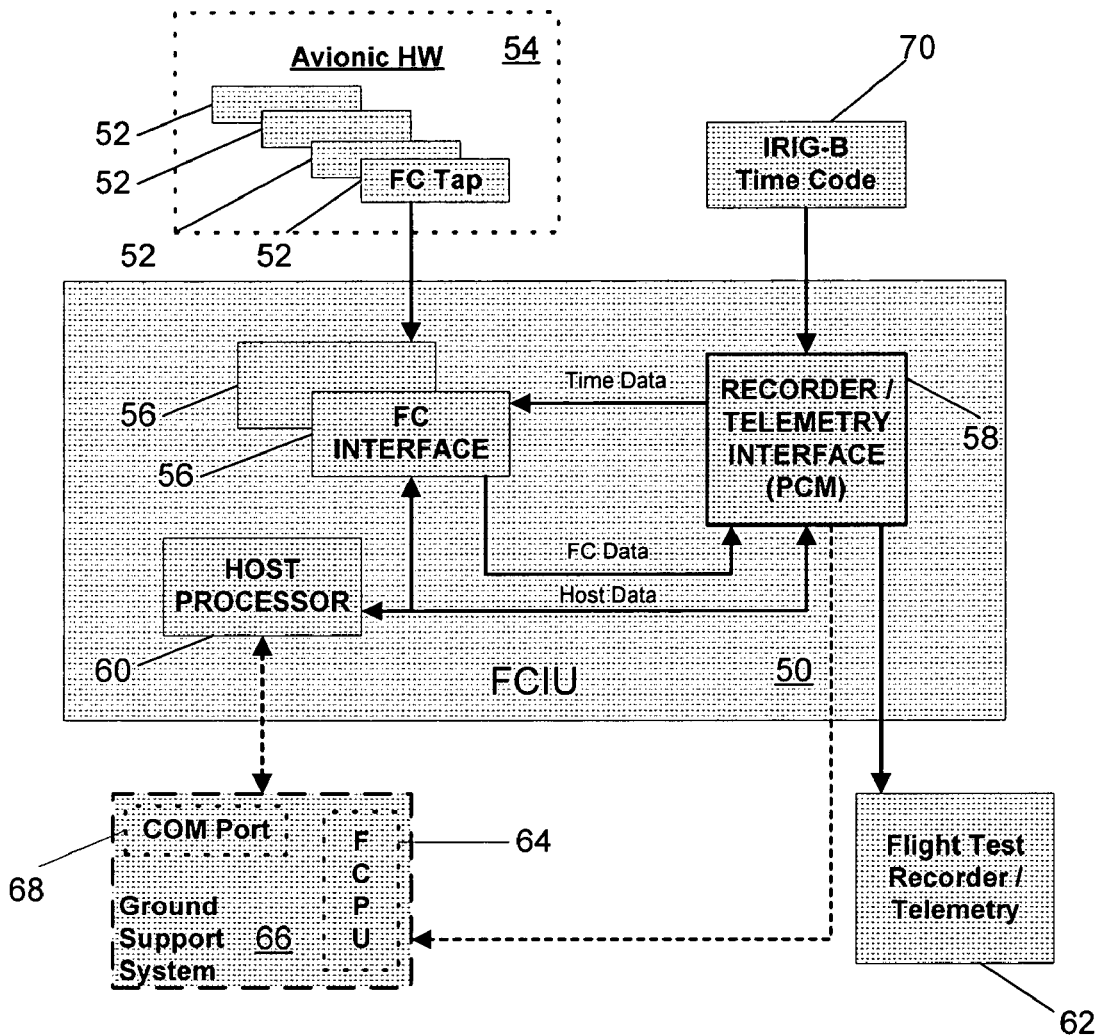
FIG. 4 is a high level block diagram of an exemplary Fibre Channel interface unit according to an embodiment of the present invention.

Referring now to FIG. 4, an exemplary, non-limiting Fibre Channel interface unit 50 is arranged to interface with at least one node 52 in a Fibre Channel network 54. Given by way of non-limiting example, the nodes 52 suitably are any electronic units that are interconnected to communicate with each other in a Fibre Channel network. For example, the nodes 52 may include avionics hardware units in an aircraft.

As is known, communications within the Fibre Channel network 54 may be conducted via frames of words. Advantageously, the interface unit 50 is a passive listener to the communications within the Fibre Channel network 54. Therefore, the interface unit 50 is configured to receive the frames of data words from the Fibre Channel network 54. A typical Fibre Channel frame that may be monitored by the interface unit 50 may include the following data words:

start of frame;
destination address;
source address;
frame control;
sequence ID/frame count;
exchange ID;
parameter field;
data block of payload word #1 through payload word #M;
cyclic redundancy check; and
end of frame.

Within this frame context, the interface unit 50 may passively listen to communications within the Fibre Channel network 54 independently of upper layer protocol. It will be appreciated that in the Fibre Channel network 54, several sequences could be opened at the same time and could be intermixed in time. Further, frames can appear at their destination nodes 52 out of sequence. This helps to increase throughput within the Fibre Channel network 54 by keeping the nodes 52 of any switch busy. However, this can significantly complicate interpretation of a Fibre Channel message by instrumentation if the instrumentation must understand the upper level protocol in order to decide which messages to record or ignore. In this situation, the instrumentation would have to be capable of buffering the entire frame sequence before deciding if the message should be recorded. With a possibility of several sequences occurring simultaneously, an unlimited number of buffers might be entailed.

Advantageously, the interface unit 50 operates like a switch in that the interface unit 50 only interprets a correct destination address for routing. As a result, the interface unit 50 only uses a small amount of buffering. In addition, the interface unit 50 can also use the source address to determine if the frame should be recorded. With this basic operating principle in mind, details will now be set forth a non-limiting embodiment of the interface unit 50.

A high level architecture of the interface unit 50 will first be explained with reference to FIG. 4. Details of the interface unit 50 will be explained with reference to FIG. 5. Exemplary system environments and applications in which the interface unit 50 suitably are used will be explained with reference to FIGS. 6-8.

Referring now to FIG. 4, an exemplary embodiment of the interface unit 50 includes at least one input interface 56, an output interface 58, and a processor 60. The input interface 56 is coupled to receive the frames of data that are transmitted from or received at the node 52 of the Fibre Channel network 54. The input interface 56 provides the received frames of data to the output interface 58 that is, in turn, coupled to provide the received frames of data to a device 62, such as a telemetry device or a recorder. The processor 60 is coupled to program and control the input interface 56 and the output interface 58. In one embodiment, the interface unit 50 advantageously has a modular design in which the input interface 56, the output interface 58, and the processor 60 are provided as modules for performing input, output, and programming and control functions. As a result, new optional input or output configurations can be added as desired without impacting the entire design of the interface unit 50.

In one non-limiting embodiment, the interface unit 50 includes two input interfaces 56, and each input interface 56 includes two Fibre Channel inputs. This configuration provides four Fibre Channel inputs into the interface unit 50. Advantageously, four Fibre Channel inputs permits the interface unit 50 to support a transmit and receive pair from two redundant switches in the Fibre Channel network 54.

The input interface 56 suitably may be an optical Fibre Channel transceiver with optical terminations that connect to the node 52. Alternately, the input interface 56 suitably may be an electrical Fibre Channel transceiver with an electrical termination. It will be appreciated that changing from an optical connection to an electrical connection advantageously does not entail any changes to the other components of the interface unit 50. Instead, changing from an optical connection to an electrical connection is only a matter of replacing optical terminations with electrical terminations.

Each of the input interfaces 56 has an independent, programmable filter that may be adapted to capture all frames of data, or to thin input data based upon source address or destination address. Details of thinning will be explained below. If thinning is enabled, the interface unit 50 can either keep or filter the selected addresses in order to eliminate data that is not desired for a particular application. This can significantly reduce output recording bandwidth requirements.

Each of the input interfaces 56 can transmit a frame of data out of the interface unit 50 and have the frame of unit wrapped back into the input interface 56 using an external cable (not shown). This feature can be used to verify integrity of a cable link in the Fibre Channel network 54 without one of the specific nodes 52 being present.

In one presently preferred embodiment, the output interface is configured to provide the received frames of data in pulse code modulation (PCM) formatted frames. Advantageously, PCM provides a large number of processing options. For example, output from the output interface 58 can be merged onto the recorder or telemetry device 62 with other PCM streams using currently available combiners. Alternately, the output from the output interface 58 can be sent directly to the recorder or telemetry device 62.

The PCM format used by the output interface 58 in one exemplary embodiment is similar to IRIG-106, Chapter 8 for MIL-STD-1553 Mux-A11. However, the serial output word size from the output interface 58 is 36-bits instead of 24-bits for IRIG-106, Chapter 8. The 36-bit size advantageously optimizes overhead attached to each 32-bit Fibre Channel word. The output interface 58 can create up to 2 serial streams, each of which can have a baud rate up to 20 Mbps for a combined rate of 40 Mbps. The 36-bit PCM format supports up to 4 Fibre Channel streams and could support embedded PCM, digital voice and the like. The parallel output from the output interface 58 may use a 40-bit format which is upward compatible with the 36-bit format and could accommodate up to 64 Fibre Channel streams. In one exemplary embodiment, the interface unit 50 includes a backplane that connects the input interface 56 and the output interface 58. The backplane advantageously has a throughput capacity of greater than two Gigabps. This throughput capacity enables the output rate of the interface unit 50 to be enhanced in the future by substituting the PCM output with an alternate interface when high-speed, large capacity recording devices mature.

Because the output stream advantageously is PCM-formatted, the output stream may be telemetered and recovered using standard decommutators to determine word boundaries. For example, in one exemplary embodiment a Fibre Channel playback unit 64 is coupled to the output interface 58 and provides real-time monitoring of the interface unit 50. In one embodiment, the Fibre Channel playback unit 64 includes any suitable off-the-shelf processor and two standard decoms for accepting and merging the two PCM streams from the output interface 58.

In one exemplary embodiment, non-real-time analysis is performed by directly recovering data from media in the recorder 62 using software decommutators. For higher rate of recording requirements, the output interface 58 may include an 8-bit parallel output with rates up to 160 Mbps.

Advantageously, the output interface 58 may be programmed to use a "low fill" feature. In a normal mode of operation, if Fibre Channel data is not available, a "fill" word is added to the PCM frame to maintain a constant output frame rate from the output interface 58. In "low fill" mode, if Fibre Channel data is not available, the output interface 58 significantly lowers the frame rate by only adding a "fill" word to the frame at a predetermined time interval. In one exemplary embodiment, the predetermined interval is around 10 milliseconds. The "low-fill" feature keeps the PCM frames functioning such that fault isolation and activity information may be retrieved. The "low-fill" feature also advantageously conserves record storage space when there is no Fibre Channel activity.

The processor 60 controls the input interface 56 and the output interface 58. Programmable features of the input interface 56 and the output interface 58 may be programmed via the processor 60. Control and programming features of the processor 60 may be accessed by a user interface 66. The user interface 66 includes a communication (COM) port 68 that is coupled to the processor 60. In one exemplary embodiment, the COM port 68 suitably is a common RS-422 serial link for communication between the processor 60 and the user interface 66. In one exemplary embodiment, the user interface 66 may be a ground support system that includes the Fibre Channel playback unit 64. The ground support system is used by flight test personnel to control and program features of the interface unit 50 and to playback data in non-real-time when the interface unit 50 is installed in a Fibre Channel network on board an aircraft for monitoring flight test data.

Exemplary programmable features that may be controlled by the processor 60 suitably may include Fibre Channel filtering in the input interface 56 and PCM rate from the output interface 58. The processor 60 may also be used to determine a wide variety of conditions, including, for example, health of the interface unit 50, activity of the input interface 56, receipt of time codes, obtaining hardware configuration of the interface unit 50, modifying design of the interface unit 50 so features can be added without necessitating return of the interface unit 50 to the factory, and the like.

In one exemplary embodiment, the interface unit 50 advantageously receives a time code. In one embodiment, an IRIG-B direct current (DC) time code is input to the output interface 58 from a time code generator 70. The time code is typically used to tag the beginning of the PCM frames that are output by the output interface 58. The output interface 58 also provides the time code to the input interface 56 to permit time stamping occurrence of a Fibre Channel start-of-frame (SOF). The input interface 56 may attach two words of time ahead of every Fibre Channel frame captured by the input interface 56. The SOF time has a programmable resolution as desired. In one embodiment, the programmable resolution may be either 250 nanoseconds or 1 microsecond, as desired. Programming the resolution is accomplished via the processor 60.

Figure 5:
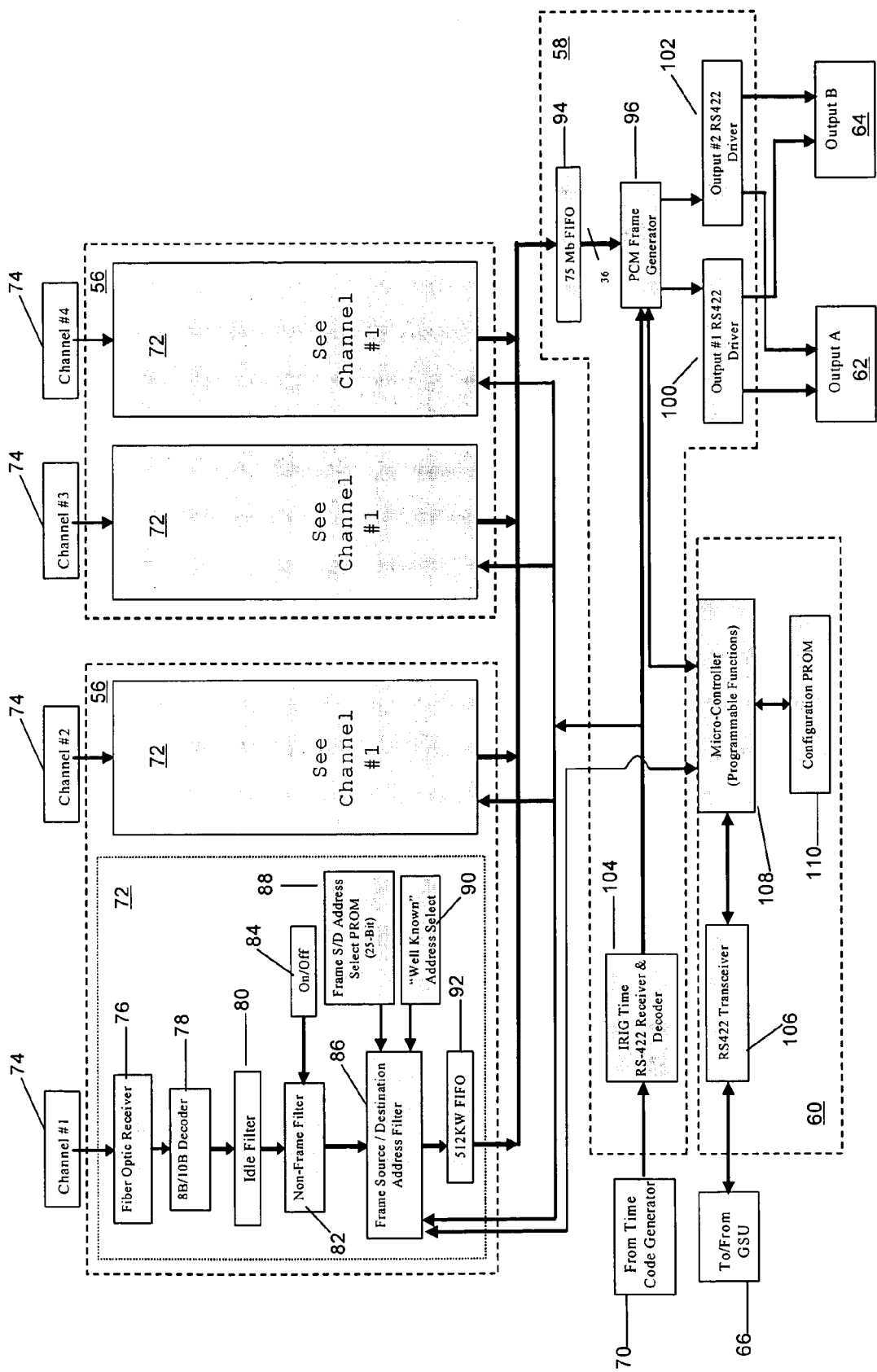
FIG. 5 is a block diagram of portions of the Fibre Channel interface unit of FIG. 4.

Referring now to FIGS. 4 and 5, details are provided regarding construction of the interface unit 50. In one embodiment, the interface unit 50 may receive up to 4 fiber optic Fibre Channel inputs. The input interface 56 may include two channels on one board. Therefore, in one embodiment, two input interfaces 56 are provided for receiving up to four input channels. Details of each input channel 72 are set forth below.

A termination 74 couples the input interface 56 to the node 52. A fiber optic receiver 76 is coupled to the termination 74 to receive input signals from the node 52. In one embodiment, the receiver 76 may be a stand-alone receiver. However, in another embodiment, the receiver 76 is part of a transceiver. Any acceptable receiver or transceiver may be used for the receiver 76 for receiving data words having characteristics as set forth above. Given by way of non-limiting example, an acceptable receiver includes a Finisar FTRJ-8519-1 receiver. A decoder 78 is coupled to the receiver 76. The decoder 78 performs standard 8B/10B decoding.

An idle filter 80 is coupled to the decoder 78. The idle filter 80 filters, that is removes, all idle primitive signals. As is known, idle primitive signals are placed on busses even when no information content is included in the signals in order to keep components in receivers synchronized or locked together.

A non-frame filter 82 filters primitive signals and sequences (other than idles). The primitive signals and sequences are not part of a frame. The primitive signals and sequences are filtered by the non-frame filter 82 on an all-or-none basis as enabled by a block 84.

Advantageously, an address filter 86 filters Fibre Channel frames based on 24-bits of source identification address or destination identification address using a frame select programmable read-only memory (PROM) 88. If desired, "well-known" source or destination addresses per the Fibre Channel specification may be provided to the address filter 86 by a well-known address select 90.

A first-in-first-out (FIFO) buffer 92 buffers bursts of Fibre Channel traffic. The buffer 92 suitably has a minimum size of 256K words. In one embodiment, the buffer 92 has a size of 512K words. If a FIFO overflow occurs, the buffer 92 does not accept any new Fibre Channel data (that is, new Fibre Channel data is ignored) until the buffer 92 has been emptied and an error word has been inserted into the output stream from the buffer 92.

In one exemplary embodiment, the output interface 58 formats the Fibre Channel words received from the buffer 92 into PCM frame format and provides the PCM frame output signals to the recorder 62 and the Fibre Channel playback unit 64. A FIFO buffer 94 is coupled to receive the Fibre Channel output stream from the buffer 92. The buffer 94 provides its output in parallel to a PCM frame generator 96. The PCM frame generator 96 may be programmed to output a single output stream, such as to the recorder 62. Alternately, the PCM frame generator 96 may be programmed to output a dual output stream, such as to the recorder 62 and the Fibre Channel playback unit 64. Each output may be a fixed word width of 36-bits and a fixed frame length of 256 words. The PCM output streams are in serial data format. The serial PCM data streams advantageously may be programmable either to contain fill words to provide a continuous clock or to contain a fill word that is inserted every 10 milliseconds for providing a more efficient PCM data frame. However, an output is still provided when no Fibre Channel data is available. In addition, merged words from different Fibre Channel inputs may be interleaved.

Output drivers 100 and 102 receive PCM formatted output from the PCM frame generator 96. The drivers 100 and 102 are coupled to provide the output data stream from the output interface 58 to the recorder 62 and/or the Fibre Channel playback unit 64, as desired. The drivers 100 and 102 suitably are RS-422 compatible drivers that are compatible with 26C32 receivers. In one exemplary embodiment, the drivers 100 and 102 provide NRZ-L or RNRZ-L serial data with a 20 Megabps maximum PCM data rate and a dynamic frame rate.

An IRIG time RS-422 receiver and decoder 104 receives IRIG time code from the time code generator 70. The receiver and decoder 104 provides time code signals to the PCM frame generator 96 and to the address filter 86.

The processor 60 includes an RS-422 transceiver 106 that is coupled to the user interface 66. Information regarding desired programmable features are communicated from the user interface 66 to the transceiver 106. In one exemplary embodiment, communications are full duplex (that is one pair for each direction) at a baud rate of 19.2K. Programming information is provided from the transceiver 106 to a controller 108, such as a micro-controller. Acceptable controllers given by way of non-limiting example include an Intel TA80C186XL-20 controller or the like. Configuration data for the interface unit 50 is stored in a configuration PROM 110. The controller 108 advantageously retrieves configuration data from the configuration PROM 110.

Figure 6:
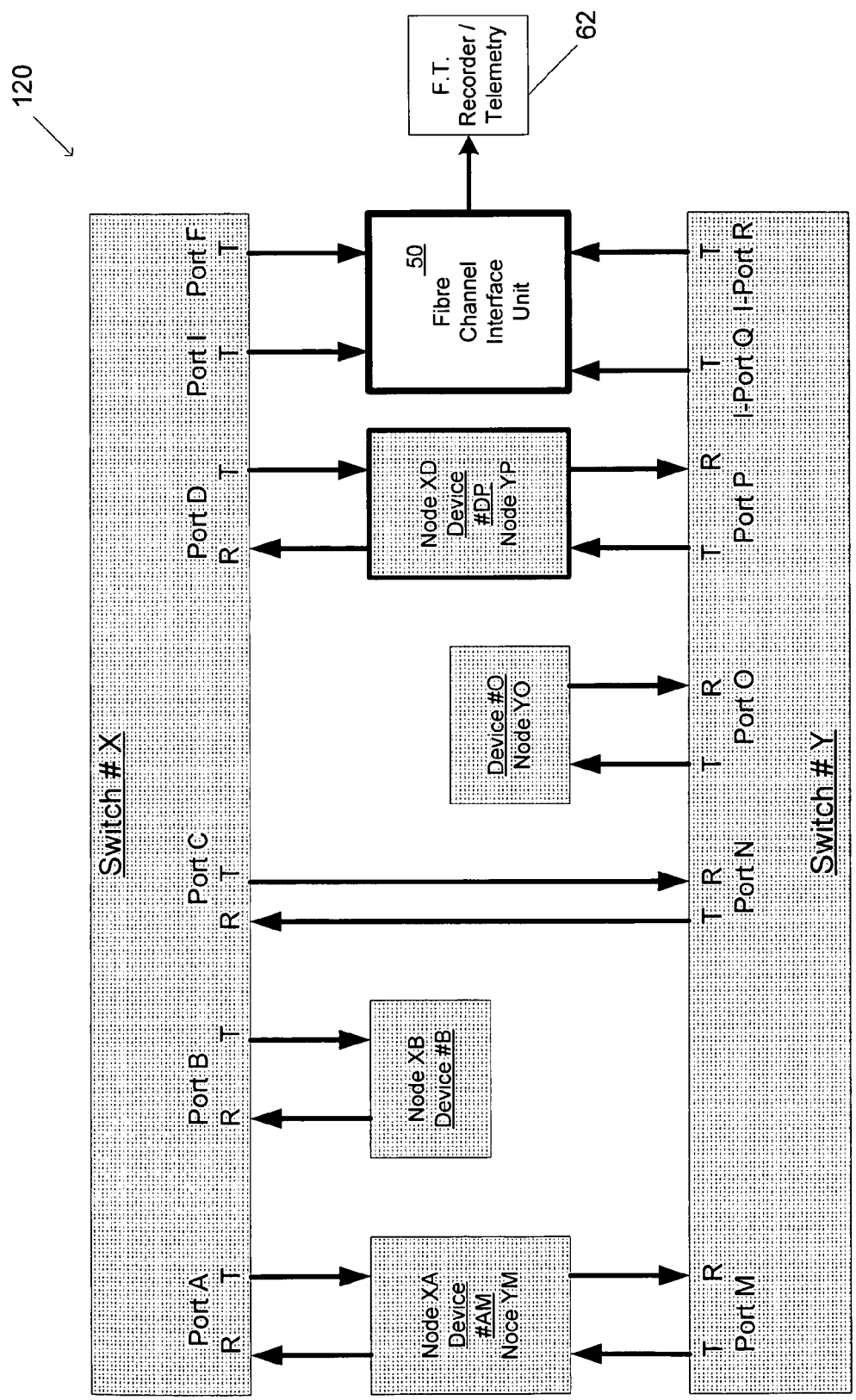
FIG. 6 is a block diagram of a Fibre Channel interface unit in one exemplary Fibre Channel network.

Referring now to FIG. 6, a Fibre Channel network 120 includes the interface unit 50 for monitoring data and the recorder 62. The network 120 includes a switch X with ports A, B, C and D. A switch Y includes ports M, N, O, and P. Each of the ports includes a transmit port T and a receive port R. Devices AM, B, O and DP are coupled to the switches X and Y. The device AM includes nodes XA and YM. The device B includes a node XB. The device O includes a node YO. The device DP includes nodes XD and YP.

The switch X includes an instrumentation port (I-port) E and an I-port F. The instrumentation ports are transmit-only ports that have special instrumentation characteristics. Likewise, the switch Y has an I-port Q and an I-port R. The interface unit 50 is coupled to the I-ports E, F, Q and R. In the embodiment shown in FIG. 6, the interface unit 50 does not converse with the I-ports E, F, Q, and R. However, the interface unit 50 is able to receive the full bandwidth of the link. Advantageously, the I-ports E, F, Q, and R are programmable to be able to listen to any transmission by or reception at a port on its respective switch X, or Y. This programmability advantageously enables reconfiguration during operation because the switch X or Y decides which ports are monitored. Advantageously, this feature is not difficult to add to the switch X or Y because normal ports are used and because the ports only are disabled from shutting down due to lack of incoming communication. In addition, internal routing tables of the switch X or Y are modified to replicate transfer of the switches port-to-port communications to multiple ports (that is, original data port and instrumentation port).

Figure 7:
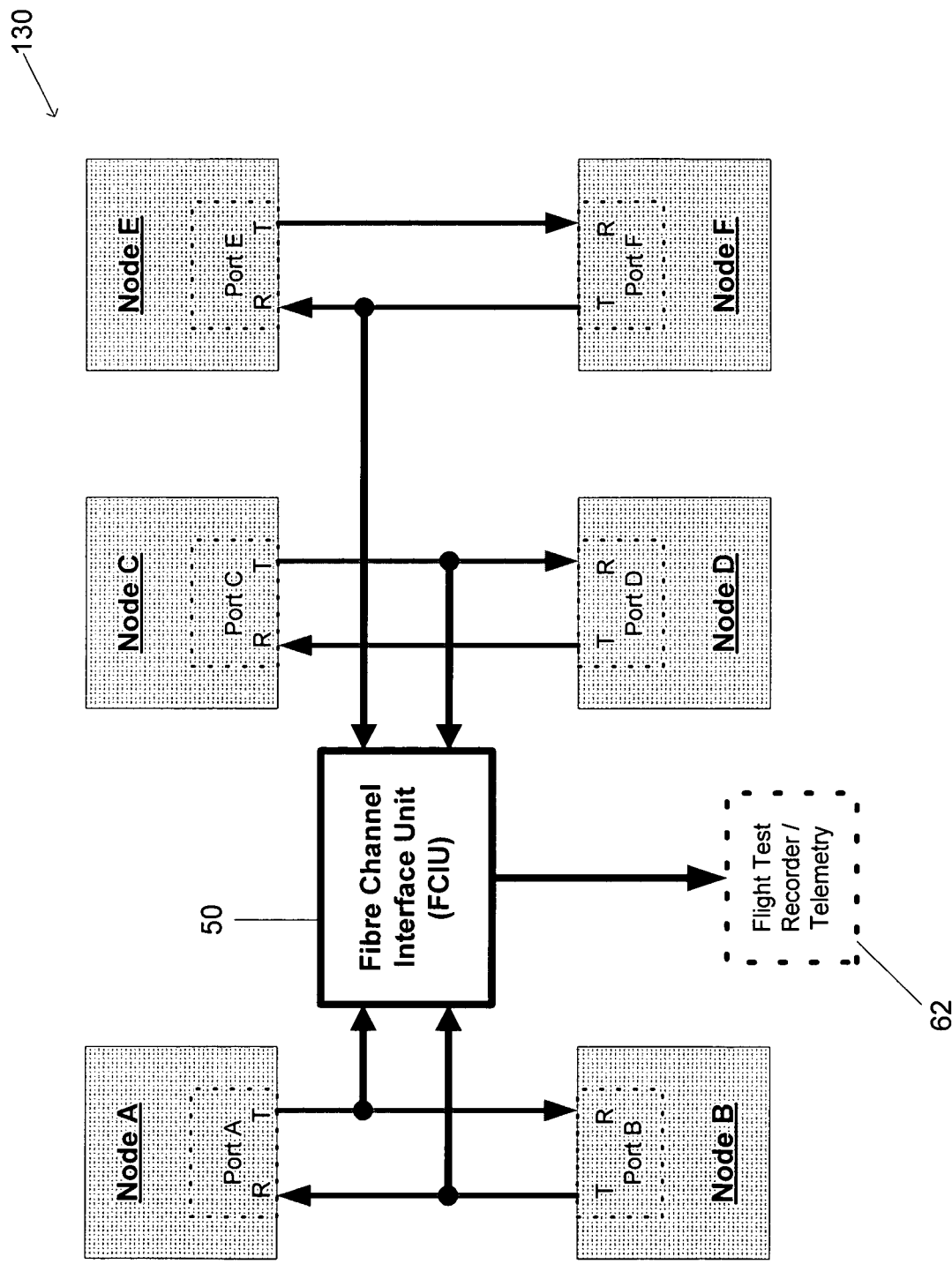
FIG. 7 is a block diagram of a Fibre Channel interface unit in another exemplary Fibre Channel network.

Referring now to FIG. 7, the interface unit 50 and the recorder 62 advantageously may be used to monitor data in an embodiment of a network 130 that does not include any Fibre Channel switches. It will be appreciated that insertion of the interface unit 50 entails breaking links between nodes. A passive coupler may be used to couple the interface unit 50 to the nodes. Alternately, an active coupler may be used without affecting signal margin in the network 130. Once the interface unit 50 is inserted into the network 130, it will be appreciated that configuration is then set. Unlike the network 120 (FIG. 6), reconfiguring the monitoring point is not provided.

Figure 8:
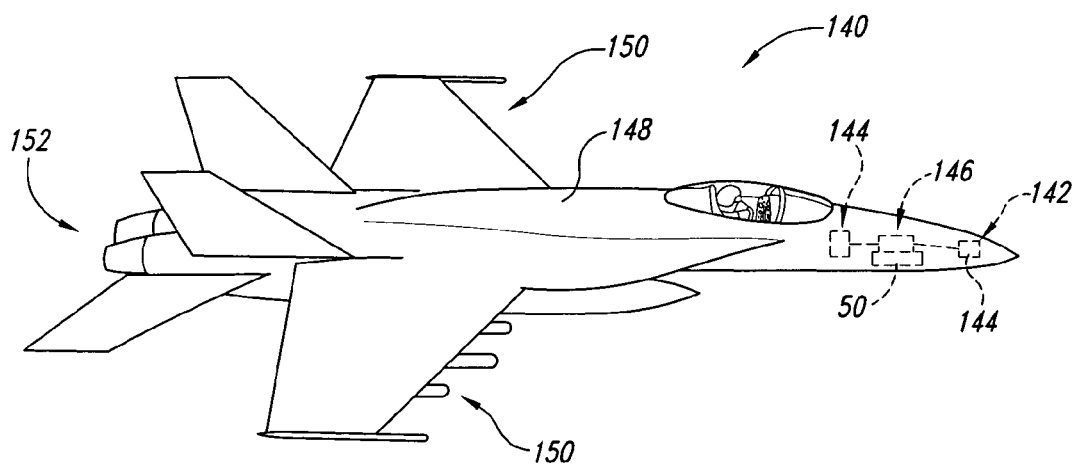
FIG. 8 illustrates an aircraft including a Fibre Channel interface unit in accordance with an embodiment of the present invention.

Referring now to FIG. 8, an aircraft 140 includes avionics, such as a radar system 142 that includes components 144 (shown in phantom) that are interconnected via a Fibre Channel network 146 (shown in phantom). It will be appreciated that the aircraft 140 may include any well known rotary wing or fixed wing aircraft, such as without limitation, an F/A-18E Super Hornet manufactured by The Boeing Company. As is known, the aircraft 140 includes a fuselage 148, lift generating, surfaces 150 such as a pair of wings, and at least one engine 152. However, it will be appreciated that the Fibre Channel network 146 may be included in any aircraft. For example, the Fibre Channel network 146 may be included in a rotary wing aircraft (not shown), such as a helicopter or a tilt-rotor aircraft or a tilt-wing aircraft or the like, that includes a rotor instead of wings as the lift generating surfaces 150. The interface unit 50 advantageously is non-intrusively inserted into the Fibre Channel network 146 for monitoring data communications within the Fibre Channel network 146 as described above.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A Fibre Channel interface unit for interfacing an output device with a plurality of nodes in a Fibre Channel network, the interface unit comprising:
    a plurality of input interfaces coupled to the nodes to passively listen for frames communicated between the nodes, the frames formatted in accordance with a Fibre Channel protocol, the input interfaces further configured to examine source and destination addresses of the frames in order to extract data wanted by the output device and eliminate data not wanted by the output device, each interface providing filtered data that is wanted by the output device; and
    an output interface configured to format the filtered data from the input interfaces in accordance with a pulse code modulated (PCM) protocol and place the formatted data into at least one lower speed output stream;
    wherein the output interface fills PCM frames with a fill word when a frame of data is not available from the input interface.

2. The interface unit of claim 1, wherein at least one of the input interfaces and the output interface is further configured to time tag frames of the filtered data.

3. The interface unit of claim 1, wherein at least one output stream is formatted for an avionics system.

4. The interface unit of claim 1, wherein at least one output stream is formatted for a radar system.

5. The interface unit of claim 1, wherein at least one output stream is formatted for a flight recorder.

6. The interface unit of claim 1, wherein at least one output stream is formatted for a telemetry device.

7. The interface unit of claim 1, further comprising a processor coupled to the input interfaces and the output interface, the processor configured to program the filtering by the input interfaces.

8. The interface unit of claim 1, further comprising a plurality of terminations for coupling the input interfaces to the nodes.

9. A method for collecting avionics data for an aircraft output device, the method comprising:
    passively listening for frames communicated between a plurality of nodes in a Fibre Channel local area network, the frames formatted in accordance with a Fibre Channel protocol;
    selecting avionics data wanted by the output device, including examining source and destination addresses of the frames in order to extract avionics data specific to the output device and eliminate data not wanted by the output device;
    placing the filtered data into at least one lower speed output stream that is formatted for the output device in accordance with a pulse code modulated (PCM) protocol; and
    filling PCM frames with a fill word when a frame of data is not available on the network.

10. The method of claim 9, further comprising time tagging the filtered data.

11. The method of claim 9, further comprising using the output device to record the filtered data.

\* \* \* \* \*